Jan. 21, 1936.  A. ROSNER  2,028,625
BRAKE
Filed Sept. 17, 1931   2 Sheets-Sheet 1
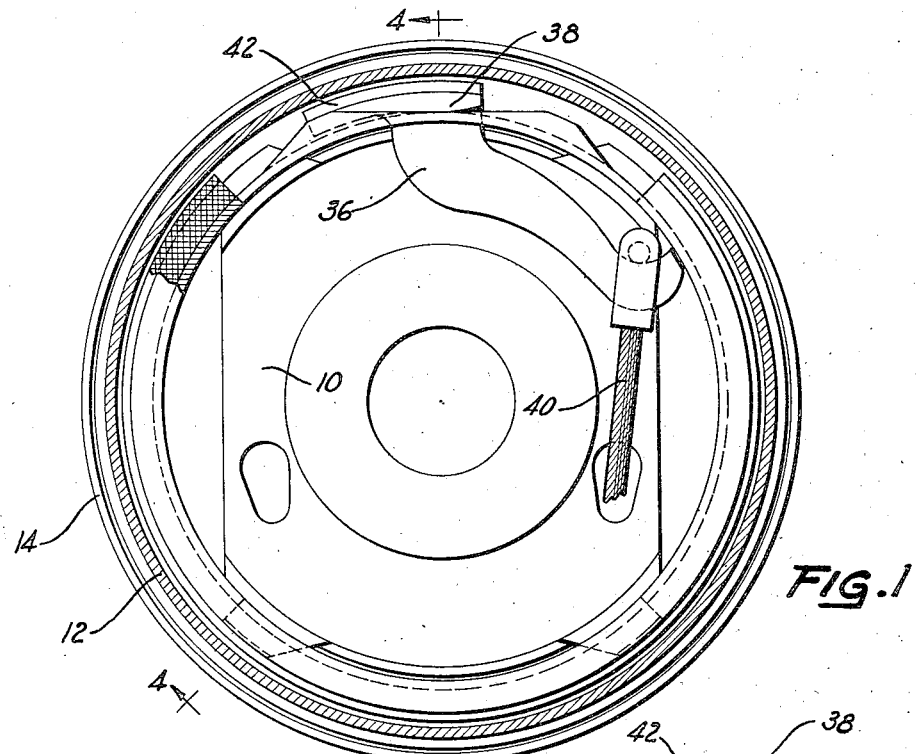
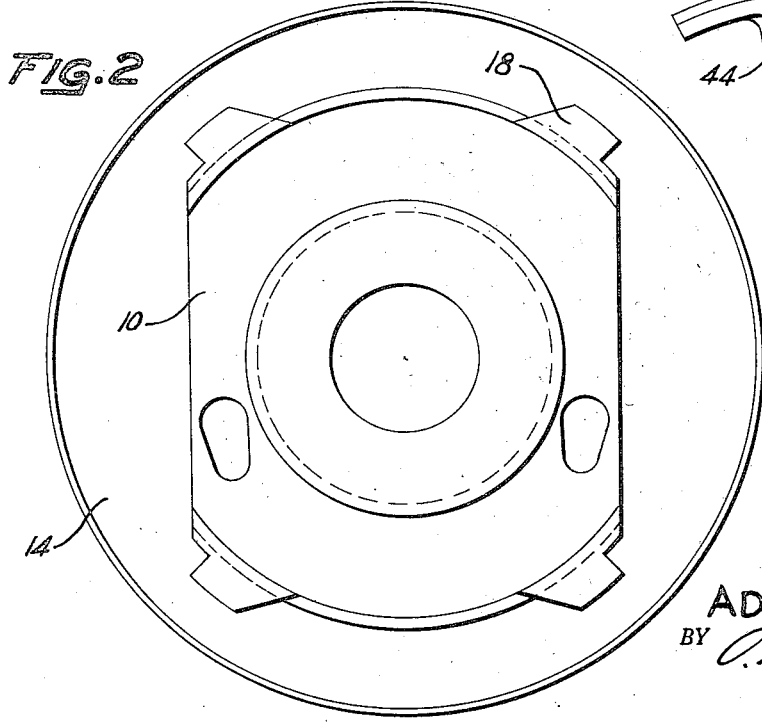
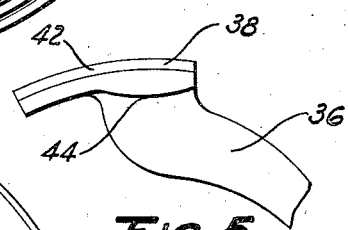
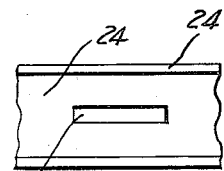
INVENTOR.
ADOLPH ROSNER
BY *O. H. Fowler*
ATTORNEY Jan. 21, 1936.        A. ROSNER        2,028,625
BRAKE
Filed Sept. 17, 1931        2 Sheets-Sheet 2

INVENTOR.
ADOLPH ROSNER
BY O.H. Fowler
ATTORNEY

Patented Jan. 21, 1936

2,028,625

UNITED STATES PATENT OFFICE 2,028,625

BRAKE

Adolph Rosner, Rockton, Ill., assignor to Bendix Aviation Corporation, South Bend, Ind., a corporation of Illinois Application September 17, 1931, Serial No. 563,254

24 Claims. (Cl. 188—78)

This invention relates to brakes and more particularly to internal expanding brakes.

Broadly, the invention comprehends an internal expanding brake of a simplified and advanced type including a rotatable drum, a dust shield cooperating with the drum to provide a housing for the brake, a friction element, a backing plate which serves as an anchor and as a guide for the friction element, and an operating means for the friction element.

In the illustrated embodiment the friction element comprises a ring or band which may be rolled from steel stock or laminated. In instances where the ring is laminated, the edges are turned upwardly and sections are removed therefrom to lend flexibility to the member.

Portions of the band are removed to provide a toggle for spreading the friction element. It is, of course, to be understood that the ring or band is faced with a suitable friction material except the portions forming the toggle. The friction element is provided with a plurality of spaced slots arranged substantially in a longitudinal plane extending through the band.

The backing plate has on its perimeter a plurality of stops arranged in spaced relation. These stops are received by the slots in the band to effectively guide the band and to take the torque. The applying means or the operating lever for the friction element includes a relatively short shoe seated in one of the cutaway portions on the band. The shoe has a relatively thin shank or lever formed integral therewith. This lever is positioned in a slot in the shoe and is connected by a suitable tension member to a source of power, not shown.

It will be observed that the brake proper includes only three elements, a backing plate which functions as an anchor for the friction element as well as a support and guide for this element, a friction element including the lining therefor and the operating lever. The arrangement and structure of these particular elements have rendered it possible to produce a brake in which the number of required parts have been greatly reduced without sacrificing the performance sought.

A brake of this type has many advantages over the prior art because of the great savings in the cost of production. All springs, cotter pins, washers, and other accessories generally employed in brake structures have been eliminated.

An advantage over the prior art is the absolute lack of any distortion of the backing plate due to overhanging the anchors or pins. The torque is taken to the center of the band by the backing plate through the lugs formed integral therewith.

Another advantage is to be found in the applying means or operating lever which is also located on the center band of the friction element.

Further advantages over the prior art are to be found in the dust shield which may be constructed of relatively thin material since it has no other function than to house the brake structure. The lining wear is taken up by shortening the operating cable, hence, there is no need of openings in the backing plate which permit dust and dirt, etc.

A further advantage is to be found in the applying means or operating lever which engages with the drum thus holding or retaining the friction element or band against either one of two anchors depending upon the direction of drum rotation.

The invention comprises many other advantages and features which will more specifically appear from the following description taken in connection with the drawings forming a part of this specification, and in which:

Figure 1 is a vertical section of a brake taken just back of the head of the drum illustrating the friction element in side elevation;

Figure 2 is a side elevation of the backing plate and dust shield assembly;

Figure 5 is an enlarged detailed view of the operating lever.

Figure 6 is a fragmentary view of the friction element;

Figure 3:
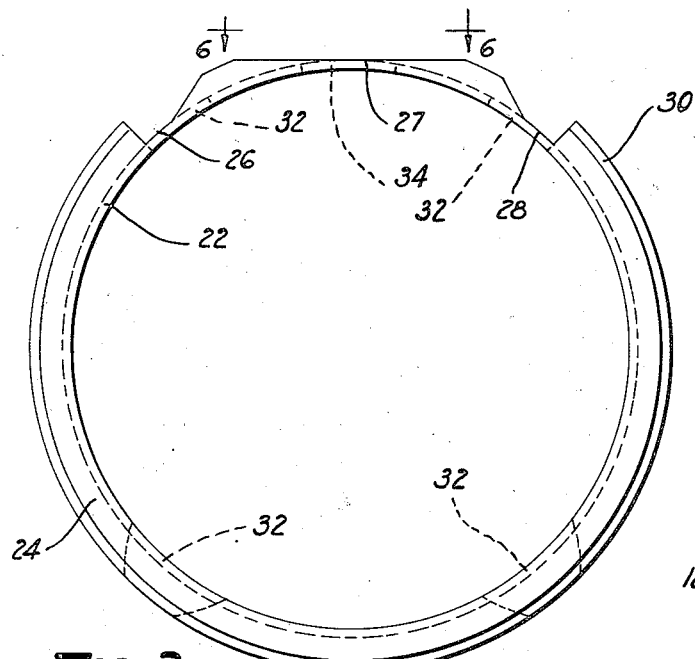
Figure 3 is a side elevation of the friction element.
Figure 4:
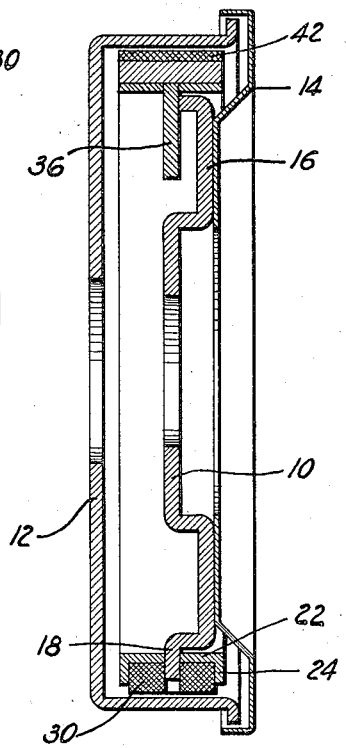
Figure 4 is a vertical sectional view substantially on line 4—4, Figure 1.

Referring to the drawings for more specific details of the invention, 10 represents a backing plate which may be secured to a swivelling knuckle or an axle, not shown. The backing plate has associated therewith a rotatable drum 12 which may be secured to a wheel, also not shown, and supported on the backing plate is a dust shield 14 cooperating with the drum for housing the brake.

As shown, the backing plate 10 has an offset portion 16 and radial lugs 18. The lugs 18 are arranged in pairs in spaced relation with their shoulders in oppositely disposed positions. The backing plate and shields are interchangeable and may be used for either right or left hand brakes.

Positioned for movement on the backing plate is a friction element comprising a band 22 rolled from steel stock with upturned stiffening webs 24. As shown, a portion of the webs 24 are cut away as at 26, 27 and 28 to provide in effect a toggle. The band 24 has suitably secured thereto a friction lining or facing 30 adaptable for cooperation with the drum. The band is also provided with a plurality of slots 32 adaptable for the receipt of the lugs 18 and a slot 34 in which is positioned the shank of an operating lever 36.

As shown, an interchangeable lever 36 has formed upon its force applying end a relatively short shoe 38 adapted to engage the drum, and the shank of the lever is positioned in the slot 34 and extends into the offset portion 16 of the backing plate where it is suitably connected through a tension member 40 to a suitable source of power, not shown. The shoe portion of the lever has suitably secured thereto a friction lining 42 and the underface of the shoe is curved as indicated at 44. This curved surface seats on the cutaway portion 27.

When force is applied to the operating lever the shoe portion of the lever engages the drum and the curved portion 44 presses against the center of the toggle formed by the cutaway portions 26, 27 and 28 to spread the band into drum engagement. When the shoe portion of the lever engages the rotating drum, the band is given a slight rotation according to the direction of drum rotation, this brings the band against one of the lugs or anchors depending on the direction of rotation of the drum.

Figure 7:
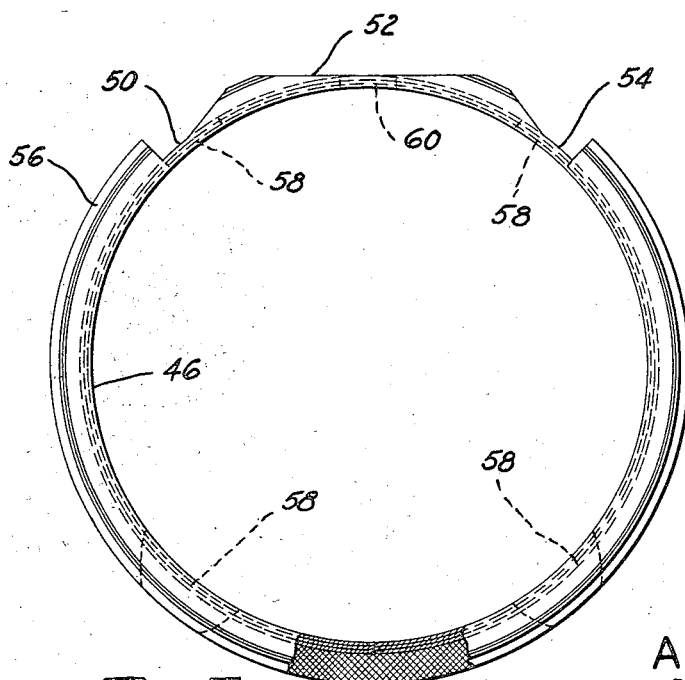
Figure 7 is a modification of the friction element.
Figure 8:
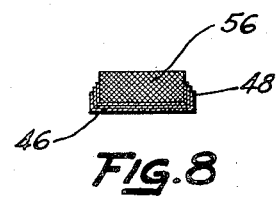
Figure 8 is a cross sectional view of the friction element shown in Figure 7.
Figure 9:
Figure 9 is a cross sectional view of laminated stock from which the friction element shown in Figure 7 is formed.

Figures 7, 8 and 9 illustrate a modified form of the friction element. In this modification the band 46 is laminated. Strengthening webs are formed on the band by turning up the edges thereof as shown at 48. The webs have portions 50, 52 and 54 removed therefrom to form in effect a toggle and the band is faced with a suitable friction material 56 except the portions forming the toggle. The band is provided with spaced slots 58 for the reception of the lugs or stops 18. It is also provided with a slot 60 for the reception of the operating lever.

In practice the band is sprung over the anchors which also serve as guides. If preferred the ring may be split at the center of the toggle should it be found more convenient in assembling. It will, of course, be understood that flexibility of the band is essential. Although the shoe may be light it must have sufficient tension in itself to release the brake, as no return springs are contemplated.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I desire to secure by Letters Patent is:

1. A brake comprising a backing plate of pressed sheet-metal having outwardly-extending radial lugs at its periphery forming anchors arranged in spaced relation upon its perimeter.

2. A brake comprising a backing plate of pressed sheet-metal having an offset portion and having radial lugs forming integral anchors on the periphery thereof.

3. A brake comprising a friction element having portions removed therefrom to form in effect a toggle, and having an applying device for applying pressure to the toggle.

4. A brake comprising a friction element having strengthening webs with portions removed therefrom to form in effect a toggle, and having means for exerting brake-applying pressure directly on said toggle.

5. A brake comprising a friction element including a band having strengthening webs with portions removed therefrom to form in effect a toggle and a frictional lining on the band between the webs.

6. A brake comprising a friction band and a floating operating lever supported by said band and including a relatively short shoe and a shank.

7. A brake comprising a friction band and a floating operating lever supported by said band and comprising a relatively short shoe, a shank integral therewith and a liner for the shoe.

8. A brake comprising a friction band and a floating operating lever supported by said band and including a relatively short shoe, an arm extending therefrom and curved surfaces on the underface of the shoe flanking the arm.

9. A brake comprising a pressed sheet-metal backing plate, a friction band supported thereby and having slots formed therein, and lugs on the edge of said plate projecting through said slots and forming anchors on the backing plate for taking the load in the center of the band.

10. A brake comprising a backing plate, a friction element associated therewith and anchors on the perimeter of the backing plate for taking the load in the center of the friction element, and a floating applying lever engaging the friction element and swinging beside the plate in a plane parallel thereto.

11. A brake comprising a backing plate, a friction element supported thereby and means on the backing plate for supporting the friction element against lateral movement, means on the backing plate for anchoring the friction element and an operating element having a portion intermediate the drum and the friction element.

12. A brake comprising a fixed member, a rotatable drum associated therewith, a friction element supported for slight centrifugal movement thereon, torque taking guides on the fixed members for the friction element and an operating member including a servo shoe between the friction element and the drum.

13. A brake comprising a fixed member having radial lugs a rotatable drum associated therewith, a friction element supported for movement by the lugs for guidance and torque reaction and an operating member including a servo shoe between the friction element and the drum.

14. A brake comprising a fixed support having peripheral lugs arranged in spaced relation, a rotatable drum associated therewith, a friction element positioned for movement on the lugs, webs on the friction element having portions removed to form in effect a toggle, an operating member supported by the friction member at the knee of the toggle and a servo shoe on the operating member positioned between the friction element and the drum.

15. A brake comprising a friction element including a laminated ring having portions removed to form in effect a toggle.

16. A brake comprising a friction element including a laminated ring having its edges turned to provide strengthening webs and portions of the webs cut away to provide in effect a toggle.

17. A brake comprising a friction element including a laminated ring having its edges turned to provide strengthening webs and portions of the webs cut away to provide a toggle and friction material positioned on the face of the ring between the strengthening webs.

18. A brake comprising a drum and friction means, and a floating applying lever carried by said means and having a friction shoe rigid therewith and engageable with the drum.

19. A brake comprising a drum and friction means shiftable from one anchorage to another according to the direction of drum rotation, and a floating applying lever carried by said means and having a friction shoe engageable with the drum.

20. A brake comprising friction means formed with a slot, and an applying lever extending through said slot and having a friction shoe at its outer end.

21. A brake comprising friction means formed with a slot, an applying lever extending through said slot and fulcruming on said means and having a friction shoe at its outer end, and operating connections acting on the inner end of said lever.

22. A brake comprising a drum, a backing plate having mounted thereon friction means engageable with the drum, and an applying device fulcrumed on the friction means and having a friction shoe engageable with the drum.

23. A brake comprising a drum, a backing plate having mounted thereon friction means engageable with the drum, an applying device acting on the friction means and having rigid therewith a friction shoe engageable with the drum, and a tension operating element extending through the backing plate and connected to said applying device.

24. A floating operating lever having a tension operating element connected to one end and having a friction shoe rigid therewith at its other end.

ADOLPH ROSNER.